US012755309B2

(12) United States Patent
Nigul

(10) Patent No.: US 12,755,309 B2
(45) Date of Patent: Oct. 6, 2026

(54) DIGITAL PREFERENCES BASED ON PHYSICAL STORE PATTERNS

(71) Applicant: Maplebear, Inc., San Francisco, CA (US)

(72) Inventor: Leho Nigul, Aurora (CA)

(73) Assignee: Maplebear, Inc., San Francisco, CA (US)

(*) Notice: Subject to any disclaimer, the term of this patent is extended or adjusted under 35 U.S.C. 154(b) by 937 days.

(21) Appl. No.: 17/220,816

(22) Filed: Apr. 1, 2021

(65) Prior Publication Data

US 2022/0318878 A1 Oct. 6, 2022

(51) Int. Cl.

*G06Q 30/0601* (2023.01)
*G06N 7/01* (2023.01)
*G06N 20/00* (2019.01)

(52) U.S. Cl.

CPC ........... *G06Q 30/0625* (2013.01); *G06N 7/01* (2023.01); *G06N 20/00* (2019.01); *G06Q 30/0631* (2013.01)

(58) Field of Classification Search

CPC ............ G06N 5/01; G06N 7/01; G06N 20/00; G06N 20/20; G06Q 30/06–0645; G06Q 30/08; G16Y 10/00–90

See application file for complete search history.

(56) References Cited

U.S. PATENT DOCUMENTS

| | | | | |
|---|---|---|---|---|
| 9,256,890 | B1 * | 2/2016 | Schmidt | G06Q 30/0639 |
| 10,430,841 | B1 * | 10/2019 | Shah | G06Q 30/0281 |
| 11,625,434 | B2 * | 4/2023 | Bender | G06Q 30/0641 707/798 |
| 11,915,289 | B2 * | 2/2024 | Bender | G06F 17/18 |
| 12,067,408 | B2 * | 8/2024 | Fields | G06F 11/3006 |
| 2009/0157472 | A1 * | 6/2009 | Burazin | G06Q 30/0259 705/14.57 |
| 2015/0261844 | A1 * | 9/2015 | Ramalho | H04L 67/306 707/749 |
| 2016/0098676 | A1 * | 4/2016 | Kusens | H04W 4/023 705/333 |
| 2022/0237679 | A1 * | 7/2022 | Tenneti | G06F 16/24578 |
| 2023/0306489 | A1 * | 9/2023 | Kong | G06V 10/426 |

FOREIGN PATENT DOCUMENTS

| | | | | |
|---|---|---|---|---|
| CA | 2709757 C | * | 12/2012 | G01S 11/06 |

OTHER PUBLICATIONS

Qi M, Mak H-Y, Shen Z-JM, “Data-driven research in retail operations—A review,” Naval Research Logistics 2020; 67:595-616. https://doi.org/10.1002/nav.2194 (Year: 2020).*

* cited by examiner

*Primary Examiner* — Adam L Levine
(74) *Attorney, Agent, or Firm* — Fenwick & West LLP

(57) ABSTRACT

An online concierge system determines customer preferences based on physical store patterns of the customer and provides search results based on the customer preferences during an online customer ordering session. The online concierge system may obtain customer location data while the customer is shopping in a physical warehouse. The online concierge system maps the customer location data to a warehouse floorplan layout. Based on the locations visited and the time spend at each location in the warehouse, the online concierge system determines that the customer is interested in certain types of items. The online concierge system may use the customer preferences to suggest items during online ordering sessions.

20 Claims, 7 Drawing Sheets

DIGITAL PREFERENCES BASED ON PHYSICAL STORE PATTERNS

BACKGROUND

This disclosure relates generally to ordering an item through an online concierge system, and more specifically to suggesting items for purchase based on customer preferences.

In current online concierge systems, shoppers (or "pickers") fulfill orders at a physical warehouse, such as a retailer, on behalf of customers as part of an online shopping concierge service. An online concierge system provides an interface to a customer identifying items offered by a physical warehouse and receives selections of one or more items for an order from the customer. In current online concierge systems, the shoppers may be sent to various warehouses with instructions to fulfill orders for items, and the shoppers then find the items included in the customer order in a warehouse.

When generating the interface to a consumer from which the consumer selects one or more items, the online concierge system receives information identifying items offered by a warehouse from the warehouse and generates the interface from the information received from the warehouse. The online concierge system may categorize the items identified by the warehouse from the received information and use the categorization when generating the interface. For example, the online concierge system leverages information from the warehouse describing items offered by the warehouse so the items are categorized to replicate their placement in aisles within the warehouse.

Online concierge systems typically maintain customer preferences based on the customer's digital history. For example, online concierge systems may track a customer's previous searches and purchases in order to provide relevant content to the customer.

SUMMARY

An online concierge system determines customer preferences based on physical store patterns of the customer and provides search results based on the customer preferences during an online customer ordering session. The online concierge system may obtain customer location data while the customer is shopping in a physical warehouse. The online concierge system maps the customer location data to a warehouse floorplan layout. Based on the locations visited and the time spend at each location in the warehouse, the online concierge system determines that the customer is interested in certain types of items. The online concierge system may use the customer preferences to suggest items during online ordering sessions.

The online concierge system may receive a search query from a customer through an ordering interface. The search query includes one or more search terms for identifying one or more items the customer seeks to purchase via the online concierge system. For example, the online concierge system receives a selection of a warehouse for fulfilling an order from the customer and then receives a search query to identify one or more items offered by the selected warehouse.

To identify items matching one or more of the search terms included in the search query, the online concierge system retrieves an item graph stored by the online concierge system. The item graph comprises a plurality of nodes, with each node corresponding to an item available through the online concierge system or corresponding to an attribute of an item available through the online concierge system.

The nodes in the graph may be organized in a hierarchical taxonomy. Higher orders in the taxonomy represent broader categories of items, with lower orders representing narrower categories, and lowest orders representing specific items. For example, a "food" attribute node may be connected to lower level attribute nodes representing "meat," "produce," "dairy," etc., and a lowest order node may represent item nodes for a specific brand and size of an item.

The online concierge system generates a ranking of candidate nodes based on the search query. The candidate nodes may be ranked based in part on the customer preferences. Based on the ranking, the online concierge system displays search results including one or more candidate items to the customer. For example, the online concierge system selects candidate nodes having at least a threshold position in the ranking and displays candidate items below the selected candidate nodes in the item graph as the search results.

The online concierge system displays items corresponding to the item nodes as search results. In response to the user selecting an item, the online concierge system allows the user to place an order for the specific item.

In some embodiments, a method may comprise obtaining, by an online concierge system, customer location data for a customer. The online concierge system may map the customer location data to a warehouse floorplan layout. The online concierge system may determine customer preferences based on the location data. The online concierge system may initiate a customer ordering session. The online concierge system may weigh nodes in an item graph based on the customer preferences. The online concierge system may receive a search query including one or more search terms. The online concierge system may identify candidate nodes in the item graph based on the search query. The online concierge system may generate a ranking of the candidate nodes. The online concierge system may transmit search results including one or more of the candidate nodes based on the ranking.

In some embodiments, a method may comprise obtaining, by an online concierge system, customer location data for a customer. The online concierge system may receive a warehouse floorplan layout from a warehouse. The online concierge system may map the customer location data to the warehouse floorplan layout. The online concierge system may determine customer preferences based on the location data. The online concierge system may store the customer preferences in a customer database. The online concierge system may map the customer preferences to nodes in an item graph. The online concierge system may weight the nodes in the item graph based on the customer preferences.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
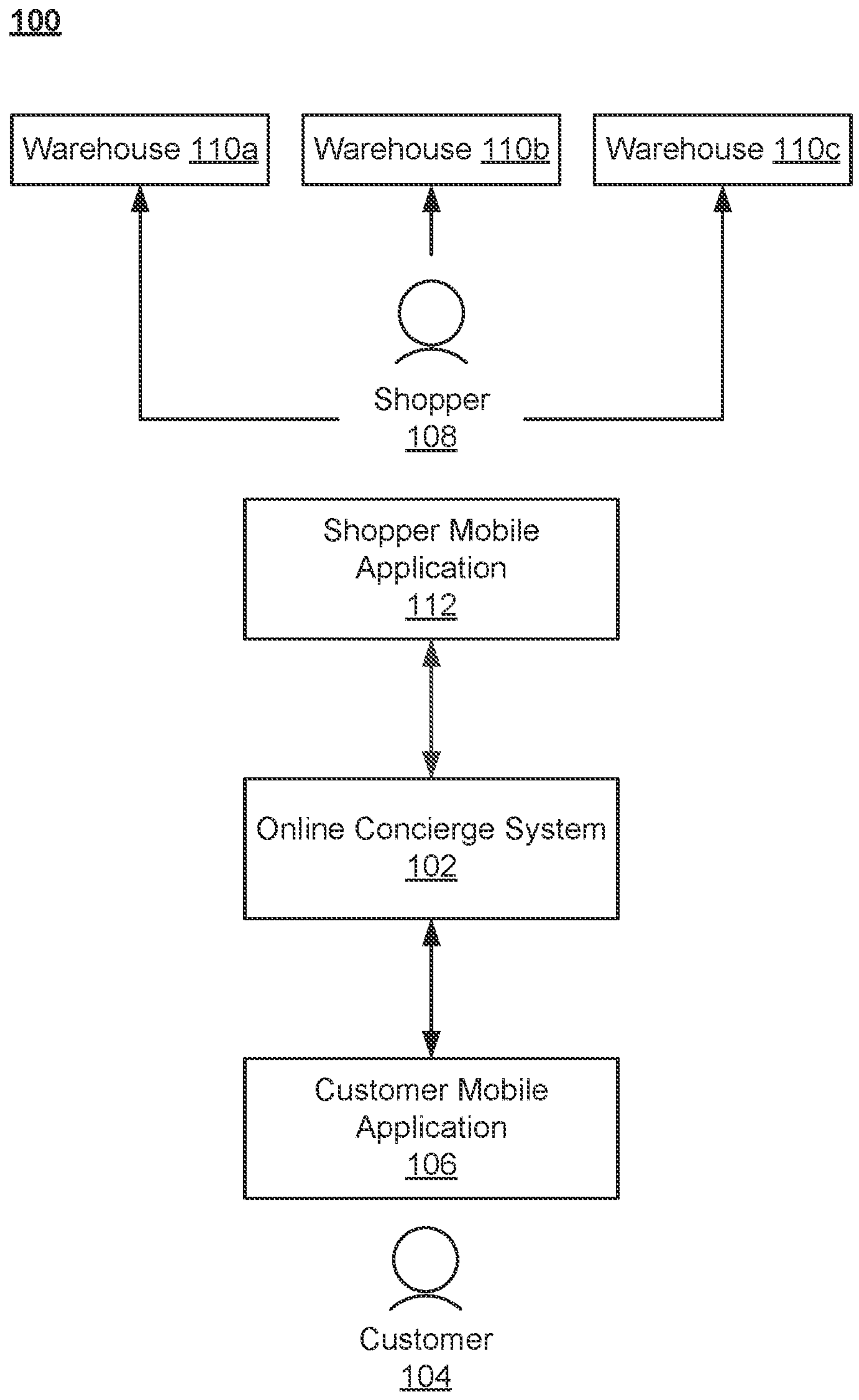
FIG. 1 illustrates an environment of an online shopping concierge service, according to one embodiment.

FIG. 1 illustrates an environment 100 of an online platform, according to one embodiment. The figures use like reference numerals to identify like elements. A letter after a reference numeral, such as "110*a*," indicates that the text refers specifically to the element having that particular reference numeral. A reference numeral in the text without a following letter, such as "110," refers to any or all of the elements in the figures bearing that reference numeral. For example, "110" in the text refers to reference numerals "110*a*" and/or "110*b*" in the figures.

The environment 100 includes an online concierge system 102. The system 102 is configured to receive orders from one or more customers 104 (only one is shown for the sake of simplicity). An order specifies a list of goods (items or products) to be delivered to the customer 104. The order also specifies the location to which the goods are to be delivered, and a time window during which the goods should be delivered. In various embodiments, the order specifies one or more retailers from which the selected items should be purchased. The customer may use a customer mobile application (CMA) 106 to place the order; the CMA 106 is configured to communicate with the online concierge system 102.

The online concierge system 102 is configured to transmit orders received from customers 104 to one or more shoppers 108. A shopper 108 may be a contractor, employee, or other person (or entity) who is enabled to fulfill orders received by the online concierge system 102. The shopper 108 travels between a warehouse and a delivery location (e.g., the customer's home or office). A shopper 108 may travel by car, truck, bicycle, scooter, foot, or other mode of transportation. In various embodiments, the delivery may be partially or fully automated, e.g., using a self-driving car. The environment 100 also includes three warehouses 110*a*, 110*b*, and 110*c* (only three are shown for the sake of simplicity; the environment could include hundreds of warehouses). The warehouses 110 may be physical retailers, such as grocery stores, discount stores, department stores, etc., or non-public warehouses storing items that can be collected and delivered to customers. Each shopper 108 fulfills an order received from the online concierge system 102 at one or more warehouses 110, delivers the order to the customer 104, or performs both fulfillment and delivery. In one embodiment, shoppers 108 make use of a shopper mobile application 112 which is configured to interact with the online concierge system 102.

Figure 2:
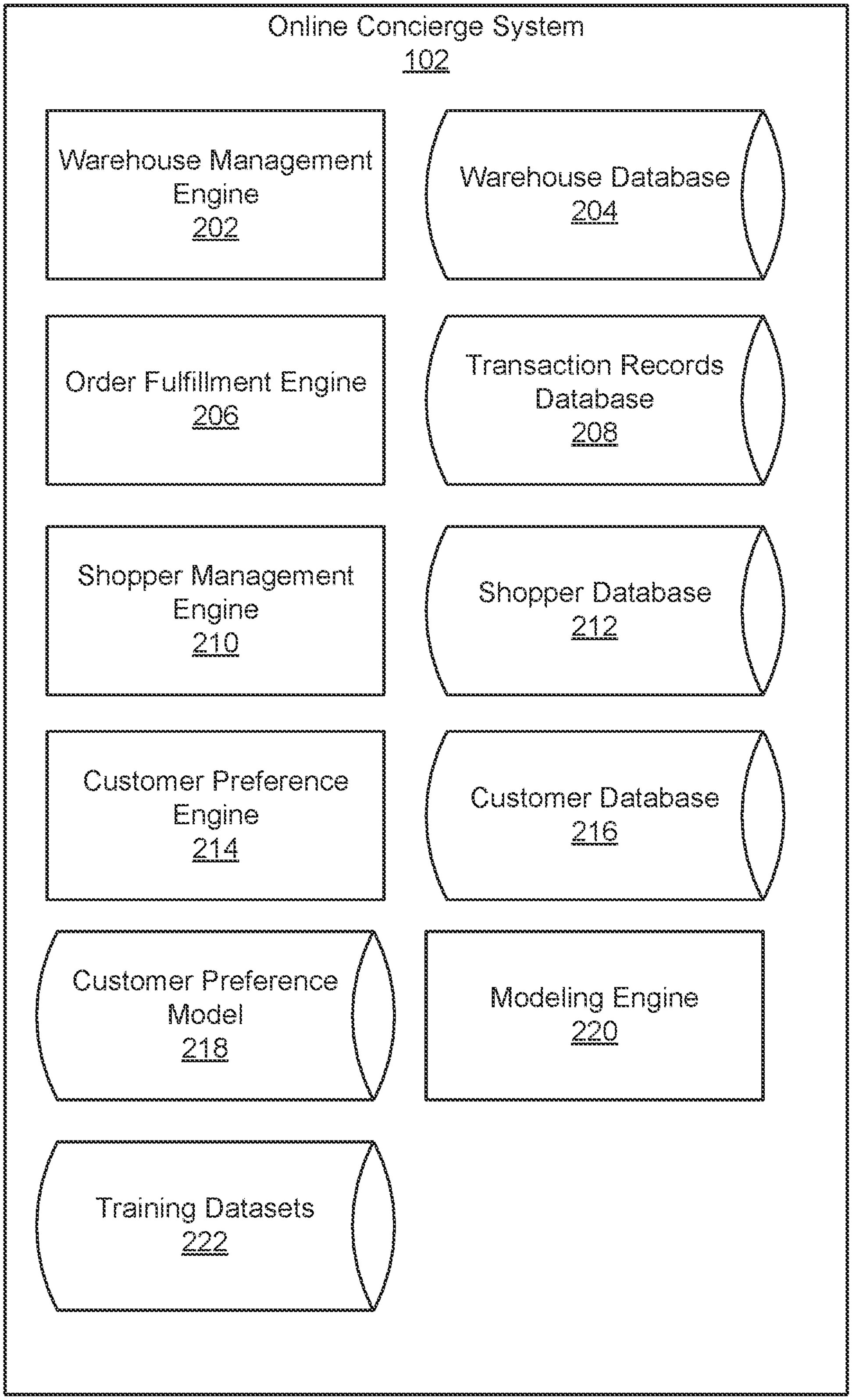
FIG. 2 is a diagram of an online shopping concierge system, according to one embodiment.

FIG. 2 is a diagram of an online concierge system 102, according to one embodiment. The online concierge system 102 includes an warehouse management engine 202, which interacts with inventory systems associated with each warehouse 110. The warehouse management engine 202 is configured to obtain information regarding each warehouse 110.

The warehouse management engine 202 is configured to obtain floorplan layout information for each warehouse 110. The floorplan layout information comprises a physical description of the warehouse 110 and the items within the warehouse 110. The physical description of the warehouse 110 may include a description of exterior boundaries of the warehouse 110. For example, the exterior boundaries of the warehouse 110 may include exterior walls, drive through areas, patio areas, parking areas, property boundaries, etc. The physical description of the warehouse 110 may include boundaries of departments within the warehouse 110, such as a produce department, meat department, dairy department, clothing department, home goods department, food court area, etc. The physical description of the warehouse 110 may include the location and description of aisles within the warehouse 110, such as the aisle numbers and item categories associated with each aisle. The floorplan layout information may be stored within the warehouse database 202.

The floorplan layout may be described using a reference system. In some embodiments, the reference system may comprise a coordinate grid, such as a latitude and longitude system. For example, the components in the floorplan layout may be described using GPS coordinates. In some embodiments, the reference system may be described relative to one or more warehouse entrances. For example, the locations of the components in the floorplan layout may be described using distances and directions from a primary entrance, such as left, right, front, back, middle. In some embodiments, aisles or departments may be subdivided into sections, such as front, middle, and back. In some embodiments, the reference system may be described relative to reference points within the warehouse. For example, beacons may be located throughout a warehouse 110, and any point within the warehouse 110 may be described based on a distance from the point to one or more beacons.

The floorplan layout information and item location information may be mapped to nodes in an item graph. For example, a produce department and/or its location in a warehouse 110 may map to a dairy attribute node in the item graph. Similarly, a specific product and/or its location in a warehouse 110 may map to an item node for that item in the item graph.

The warehouse management engine 202 requests and receives inventory information maintained by the warehouse 110. The inventory of each warehouse 110 is unique and may change over time. The warehouse management engine 202 monitors changes in inventory for each participating warehouse 110. The warehouse management engine 202 is also configured to store inventory records in an warehouse database 204. The warehouse database 204 may store information in separate records—one for each participating warehouse 110—or may consolidate or combine inventory information into a unified record. Inventory information includes both qualitative and qualitative information about items, including size, color, weight, SKU, serial number, and so on. In one embodiment, the warehouse database 204 also stores purchasing rules associated with each item, if they exist. For example, age-restricted items such as alcohol and tobacco are flagged accordingly in the warehouse database 204. Additional inventory information useful for predicting the availability of items may also be stored in the warehouse database 204. For example, for each item-warehouse combination (a particular item at a particular warehouse), the warehouse database 204 may store a time that the item was last found, a time that the item was last not found (a shopper looked for the item but could not find it), the rate at which the item is found, and the popularity of the item.

The warehouse management engine 202 is configured to obtain item location information for each warehouse 110. The item location information describes the location of each item present within the warehouse. For each item, the location may be described with reference to an area, department, aisle, floor, reference system or some combination thereof. For example, the location of a bag of flour may be described with respect to a subsection of an aisle number, GPS coordinates, direction and distance from the front entrance of the warehouse 110, or some combination thereof. The warehouse management engine 202 may receive the floorplan layout information and item location information from one or more sources. In some embodiments, each warehouse 110 may provide the warehouse management engine 202 with the floorplan layout information and item location. In some embodiments, the online concierge system 102 may employ shoppers or other individuals to visit warehouses 110 to walk through warehouses 110 and obtain the information. In some embodiments, in response to a shopper finding an item for a customer order, the shopper may scan the item at the item location using the shopper mobile application 112, and the warehouse management engine 202 may record the GPS coordinates of the item location.

The item location information may be stored in the warehouse database 204. Inventory and item location information provided by the warehouse management engine 202 may supplement the training datasets 222. training datasets 222

The online concierge system 102 also includes an order fulfillment engine 206 which is configured to synthesize and display an ordering interface to each customer 104 for a customer ordering session (for example, via the customer mobile application 106). The order fulfillment engine 206 is also configured to access the warehouse database 204 in order to determine which products are available at which warehouse 110. The order fulfillment engine 206 determines a sale price for each item ordered by a customer 104. Prices set by the order fulfillment engine 206 may or may not be identical to in-store prices determined by retailers (which is the price that customers 104 and shoppers 108 would pay at the retail warehouses). The order fulfillment engine 206 also facilitates transactions associated with each order. In one embodiment, the order fulfillment engine 206 charges a payment instrument associated with a customer 104 when he/she places an order. The order fulfillment engine 206 may transmit payment information to an external payment gateway or payment processor. The order fulfillment engine 206 stores payment and transactional information associated with each order in a transaction records database 208.

In various embodiments, the order fulfillment engine 206 also shares order details with warehouses 110. For example, after successful fulfillment of an order, the order fulfillment engine 206 may transmit a summary of the order to the appropriate warehouses 110. The summary may indicate the items purchased, the total value of the items, and in some cases, an identity of the shopper 108 and customer 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a shopper management engine 210, which manages communication with and utilization of shoppers 108. In one embodiment, the shopper management engine 210 receives a new order from the order fulfillment engine 206. The shopper management engine 210 identifies the appropriate warehouse to fulfill the order based on one or more parameters, such as a warehouse selected by a customer 104, a probability of item availability determined by a customer preference model 218, the contents of the order, the inventory of the warehouses, and the proximity to the delivery location. The shopper management engine 210 then identifies one or more appropriate shoppers 108 to fulfill the order based on one or more parameters, such as the shoppers' proximity to the appropriate warehouse 110 (and/or to the customer 104), his/her familiarity level with that particular warehouse 110, and so on. Additionally, the shopper management engine 210 accesses a shopper database 212 which stores information describing each shopper 108, such as his/her name, gender, rating, previous shopping history, and so on.

As part of fulfilling an order, the order fulfillment engine 206 and/or shopper management engine 210 may access a customer database 216 which stores information describing each customer. This information could include each customer's name, address, gender, shopping preferences, favorite items, stored payment instruments, and so on.

In various embodiments, the order fulfillment engine 206 generates and maintains an item graph, further described below in conjunction with FIG. 6. The item graph identifies connections between pairs of items and attributes of items and between pairs of attributes of items. The item graph comprises a hierarchical taxonomy of nodes. A connection between an item node and an attribute node indicates that the item has the attribute to which the item is connected. The attributes of an item may be specified by information describing the product from a warehouse 110 providing the item or determined by the order fulfillment engine 206 based on information about the item received from the warehouse 110. A connection between an attribute node and an additional attribute node may indicate a parent-child relationship between the attribute nodes. For example, an attribute node for a broad category (e.g., "meat") may be connected to a child attribute node (e.g., "pork") that is a subset of the parent attribute node. In various embodiments, a connection between an attribute node and an additional attribute node may indicate that the attribute and the additional attribute have both occurred in one or more previously received orders for items. For example, the attribute node is connected to the additional attribute node if a previously received order included an item having the attribute and having another item having the additional attribute. Similarly, the attribute node is connected to the additional attribute if a previously received order included an item having both the attribute and having the other attribute. As further described below in conjunction with FIG. 5, the order fulfillment engine 206 uses the item graph to generate search results of items in response to a search query received from a customer 104, allowing the order fulfillment engine 206 to leverage information about different attributes and items to increase a likelihood of identifying items that at least partially match the search query for inclusion in an order.

The customer preference engine 214 is configured to obtain customer preference information. The customer preference information may comprise data describing a customer's shopping habits when physically present within a warehouse 110. The customer mobile application 106 may allow the customer to opt-in to allow the customer mobile application 106 to obtain location data of the customer within the warehouse 110. The customer mobile application 106 may transmit the location data to the customer preference engine 214. The customer preference engine 214 may store the locations within the warehouse 110 visited by the customer. The customer preference engine 214 may map the location data, such as GPS coordinates, to the floorplan layout information for the warehouse 110 stored in the warehouse database 204. The customer preference engine 214 may determine the areas, departments, and aisles visited by the customer, the amount of time the customer spent in each location, the path taken by the customer through the warehouse 110, or some combination thereof. The customer preference engine 214 may compare locations where the customer stopped to item location information stored in the warehouse database 204 to determine specific items the customer may have purchased or considered purchasing. In some embodiments, the customer may be utilizing a device with a camera, such as an artificial reality headset, and the customer preference engine 214 may identify items the customer viewed or placed in a cart. Based on the location information of the customer, the customer preference engine 214 may infer preferences of the customer. For example, the customer preference engine 214 may determine that, when the customer visits a particular warehouse 110, the customer typically visits the produce department and does not visit the meat department. The customer preference engine 214 may store the customer location data and customer preferences in the customer database 216.

In some embodiments, the customer preference engine 214 may obtain customer preferences via digital information from the customer mobile application 106. For example, the customer preference engine 214 may identify previous purchases made by the customer via the customer mobile application, and the customer preference engine 214 may store the customer preferences in the customer database 216.

The customer preference database 216 stores the customer preferences. Each customer may have a customer profile stored in the customer preference database 216. The customer profile may include associations between the customers' in-store shopping location data and nodes in the item graph. For example, if a customer frequently spends time in the produce section of a warehouse 110, the customer profile for the customer may be labeled as having an interest in a node in an item graph for produce items.

Machine Learning Model

The online concierge system 102 further includes a customer preference model 218, a modeling engine 220, and training datasets 222. The modeling engine 220 uses the training datasets 222 to generate the customer preference model 218. The customer preference model 218 can learn from the training datasets 222, rather than follow only explicitly programmed instructions. The warehouse management engine 202, order fulfillment engine 206, and/or shopper management engine 210 can use the customer preference model 218 to determine a probability of a purchase for items or item categories displayed to a customer during a customer ordering session. In some embodiments, the items or item categories may be displayed initially in response to the customer initiating a customer ordering session. In some embodiments, the items or item categories may be displayed as search results in response to a customer's search query. In some embodiments, the customer preference model 218 may be used to autocomplete search queries entered by a customer. For example, based on the customer entering one or more letters in a search field, the customer preference model 218 may identify search terms corresponding to items or categories of items the customer may be interested in purchasing based on the information stored in the customer database 216. A single customer preference model 218 is used to predict the conversion probability of any number of items.

The customer preference model 218 can be configured to receive inputs including in-store customer location data, warehouse floorplan layouts, item location information, information about an item, previous purchases of the item, previous search terms entered by customers, subsequent search terms entered by consumers, and the popularity of the item. The customer preference model 218 may be adapted to receive any information that the modeling engine 220 identifies as indicators of a conversion. Items stored in the warehouse database 204 may be identified by item identifiers. In various embodiments, various attributes, some of which are specific to the warehouse (e.g., a time that the item was last found in the warehouse, a time that the item was last not found in the warehouse, the rate at which the item is found, the popularity of the item), may be stored for each item in the warehouse database 204. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. Based on the identifier(s), the online concierge system 102 can extract information about the item and/or warehouse from the warehouse database 204 and/or warehouse database and provide this extracted information as inputs to the customer preference model 218.

The customer preference model 218 contains a set of functions generated by the modeling engine 220 from the training datasets 222 that relate the item, in-store customer location data, warehouse floorplan layouts, item location information, warehouse, previous purchase information, query information, and/or any other relevant inputs, to the probability that the customer will purchase the item (also referred to as a conversion probability). Thus, for a given item-query pair, the customer preference model 218 outputs a probability that the item will be purchased by a customer when displayed to the customer in response to a search query. The customer preference model 218 constructs the relationship between the input item-query pair and/or any other inputs and the conversion probability that is generic enough to apply to any number of different item-query pairs. In various embodiments, the conversion probability output by the customer preference model 218 includes a confidence score. The confidence score may be the error or uncertainty score of the output conversion probability and may be calculated using any standard statistical error measurement. In some examples, the confidence score is based in part on whether the item-query pair conversion prediction was accurate for previous delivery orders (e.g., if the item was predicted to be purchased but did not lead to a conversion, or predicted not to lead to a conversion but was ultimately purchased by the customer). In some examples, the confidence score is based in part on the age of the data for the item, e.g., conversion information received in the last week may be weighted more heavily than conversion information received the previous week. In some embodiments, the confidence score is based in part on the age of the customer location data. The set of functions of the customer preference model 218 may be updated and adapted following retraining with new training datasets 222. The customer preference model 218 may be any machine learning model, such as a neural network, boosted tree, gradient boosted tree or random forest model. In some examples, the customer preference model 218 is generated from XGBoost algorithm.

The conversion probability generated by the customer preference model 218 may be used to determine items displayed to the customer 104 in response to a search query, as described in further detail below. In some embodiments, the conversion probability generated by the customer preference model 218 may be used to determine initial item categories, or the displayed order of initial item categories displayed to the customer during a customer ordering session.

The training datasets 222 relate a variety of different factors to known conversion information from the outcomes of previous delivery orders (e.g. if an item was previously purchased or not purchased during a customer ordering session). The training datasets 222 include the in-store customer location data, warehouse floorplan layouts, item location information, items included in previous delivery orders, the search terms entered by customers, warehouses associated with the previous delivery orders, and a variety of attributes associated with each of the items (which may be obtained from the warehouse database 204). Each piece of data in the training datasets 222 includes the outcome of a previous delivery order (e.g., if the item was purchased or not). The item attributes may be determined by the customer preference model 218 to be statistically significant factors predictive of the item's conversion probability. For different items, the item attributes that are predictors of conversion probability may be different. For example, an item type factor might be the best predictor of conversion for dairy items, whereas a time of day may be the best predictive factor of conversions for pre-made dinners. For each node, the customer preference model 218 may weight these factors differently, where the weights are a result of a "learning" or training process on the training datasets 222. The training datasets 222 are very large datasets taken across a wide cross section of warehouses, search terms, customers, items, delivery orders, times, and item attributes. The training datasets 222 are large enough to provide a mapping from a search query to a likelihood that an item will be purchased by the customer. In addition to previous delivery orders, the training datasets 222 may be supplemented by customer profile information provided by the customer database 216.

Machine Learning Factors

The training datasets 222 include associations between in-store customer location data, warehouse floorplan layouts, item location information, information about an item, previous purchases of the item, previous items or item categories displayed to a customer, previous search terms entered by customers, subsequent search terms entered by customers, and conversions resulting from the search terms and displayed search results. The data in the training datasets 222 is labeled based on whether or not, for customer location data and search terms entered by a customer, displayed search results resulted in a conversion to produce a labeled set of training data. In some embodiments, the data in the training datasets 222 may be labeled based on whether or not, for items or item categories displayed to a customer prior to a search, the displayed items or item categories resulted in a conversion. The online concierge system 102 trains the customer preference model 218 using the set of training data. The system applies the model to future customer ordering sessions to determine a probability of whether a displayed item will lead to a conversion.

The training datasets 222 may include a time associated with previous delivery orders. In various embodiments, the training datasets 222 include a time of day at which each previous delivery order was placed. Time of day may impact conversion rates, since during different times of day, or different days of the week, customers may skew purchases towards different items. In various embodiments, training datasets 222 include a time interval since an item was previously purchased in a previous delivery order. In various embodiments, training datasets 22 may include a time interval since the customer visited a particular location in a warehouse. If an item has recently been purchased at a warehouse, this may increase the probability that future orders may include the item. If there has been a long time interval since an item has been picked, this may indicate that the probability that the item will be purchased in subsequent orders is low. In some examples, training datasets 222 may also include a rate at which an item is typically purchased by a customer, a number of days since the customer last purchased the item, a number of days since the customer was last near the item in a warehouse, or any number of additional rate or time information. The relationships between this time information and conversion probability are determined by the modeling engine 220 training a machine learning model with the training datasets 222, producing the customer preference model 218.

The training datasets 222 include item attributes. In some examples, the item attributes include a department associated with the item. For example, if the item is yogurt, it is associated with the dairy department. The department may be the bakery, beverage, nonfood and pharmacy, produce and floral, deli, prepared foods, meat, seafood, dairy, the meat department, or dairy department, or any other categorization of items used by the warehouse. The item attributes may include an item popularity score. The item popularity score for an item may be proportional to the number of delivery orders received that include the item. The item popularity score for an item may be proportional to the number of search queries received for the item. In some examples, the item attributes include a product type associated with the item. For example, if the item is a particular brand of a product, then the product type attribute will be a generic description of the product type, such as "milk" or "eggs." The product type attribute may affect the conversion probability, since certain product types may have a higher reordering rate than others. In some examples, the item attributes may include a total number of delivery orders received for the item, whether or not the product is organic, vegan, gluten free, or any other attributes associated with an item. The relationships between item attributes and conversion probabilities are determined by the modeling engine 220 training a machine learning model with the training datasets 222, producing the customer preference model 218.

The training datasets 222 may include additional item attributes that affect the conversion probability and can therefore be used to build the customer preference model 218 relating the node selection for a displayed item to its predicted conversion probability. The training datasets 222 may be periodically updated with recent previous conversion information. Following updating of the training datasets 222, a modeling engine 220 may retrain a model with the updated training datasets 222 and produce a new customer preference model 218.

Customer Mobile Application

Figure 3A:
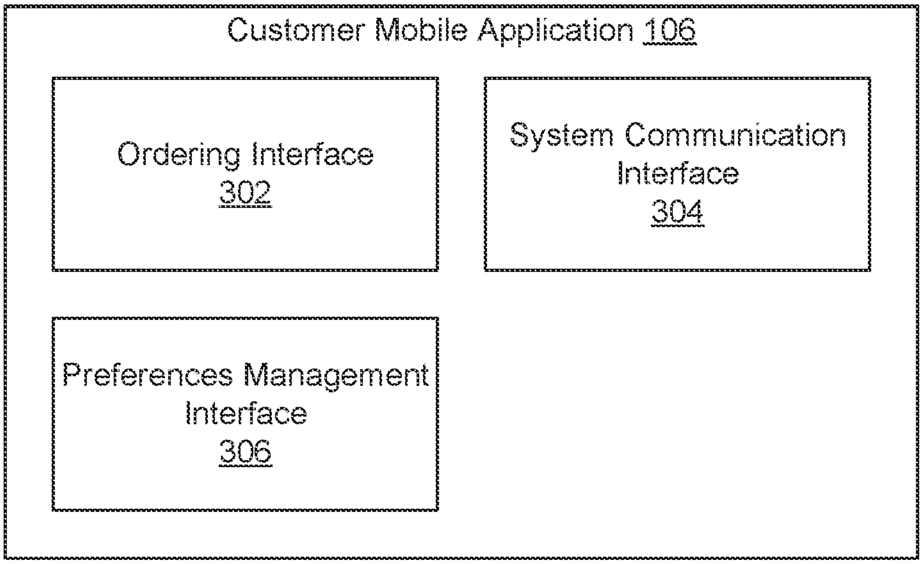
FIG. 3A is a diagram of a customer mobile application (CMA), according to one embodiment.

FIG. 3A is a diagram of the customer mobile application (CMA) 106, according to one embodiment. The CMA 106 includes an ordering interface 302, which provides an interactive interface with which the customer 104 can browse through and select products and place an order. The ordering interface 302 provides a search query interface for the customer to enter a search query. The ordering interface 302 displays items corresponding to item nodes from the item graph as results to the search query. The customer may select an item to order a specific item. The CMA 106 also includes a system communication interface 304 which, among other functions, receives inventory information from the online shopping concierge system 102 and transmits order information to the system 102. The CMA 106 also includes a preferences management interface 306 which allows the customer 104 to manage basic information associated with his/her account, such as his/her home address and payment instruments. The preferences management interface 306 may also allow the customer to manage other details such as his/her favorite or preferred warehouses 110, preferred delivery times, special instructions for delivery, etc.

Shopper Mobile Application

Figure 3B:
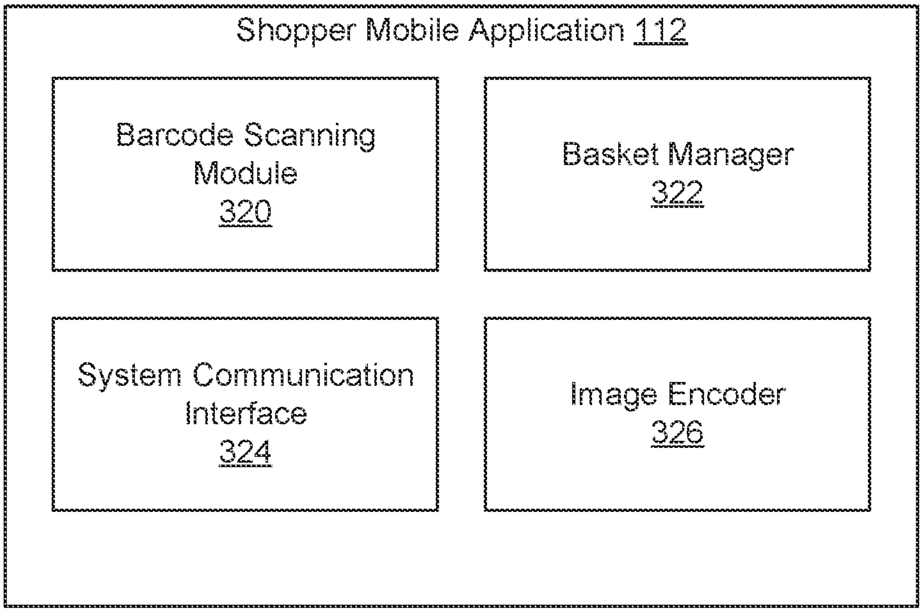
FIG. 3B is a diagram of a shopper mobile application (SMA), according to one embodiment.

FIG. 3B is a diagram of the shopper mobile application (SMA) 112, according to one embodiment. The SMA 112 includes a barcode scanning module 320 which allows a shopper 108 to scan an item at a warehouse 110 (such as a can of soup on the shelf at a grocery store). The barcode scanning module 320 may also include an interface which allows the shopper 108 to manually enter information describing an item (such as its serial number, SKU, quantity and/or weight) if a barcode is not available to be scanned. SMA 112 also includes a basket manager 322 which maintains a running record of items collected by the shopper 108 for purchase at a warehouse 110. This running record of items is commonly known as a "basket". In one embodiment, the barcode scanning module 320 transmits information describing each item (such as its cost, quantity, weight, etc.) to the basket manager 322, which updates its basket accordingly. The SMA 112 also includes a system communication interface 324 which interacts with the online shopping concierge system 102. For example, the system communication interface 324 receives an order from the system 102 and transmits the contents of a basket of items to the system 102. The SMA 112 also includes an image encoder 326 which encodes the contents of a basket into an image. For example, the image encoder 326 may encode a basket of goods (with an identification of each item) into a QR code which can then be scanned by an employee of the warehouse 110 at check-out.

Warehouse Floorplan Layout

Figure 4:
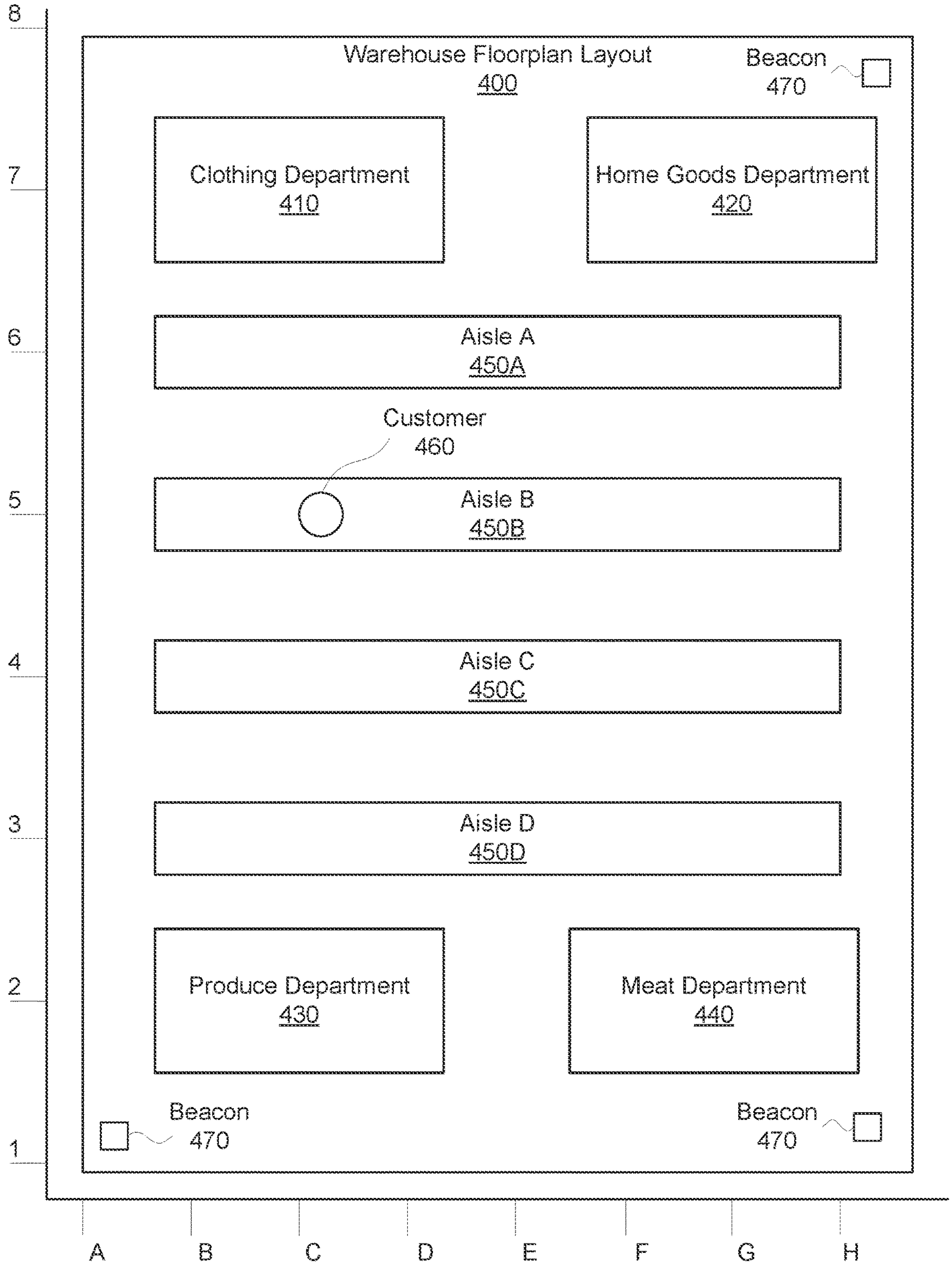
FIG. 4 is a diagram of a warehouse floorplan layout, according to one embodiment.

FIG. 4 illustrates a model of a warehouse floorplan layout 400. The warehouse floorplan layout 400 is a digital representation of a physical layout of a warehouse. The illustrated warehouse floorplan layout 400 comprises a clothing department 410, a home goods department 420, a produce department 430, a meat department 440, and four aisles 450A, 450B, 450C, and 450D. Different warehouse floorplan layouts may comprise many different types and arrangements of departments and aisles.

The warehouse floorplan layout 400 may be represented with a reference coordinate system. As illustrated, a reference coordinate system may be described as a letter and number reference coordinate system, with reference to the bottom left corner of the warehouse floorplan layout. For example, the produce department 430 may be located at approximately C2 on the illustrated reference coordinate system, and the home goods department 420 may be located at approximately G7 of the illustrated reference coordinate system. In various embodiments, the reference coordinate system may be described with reference to a latitude and longitude reference coordinate system, a township and range reference coordinate system, or any other suitable reference coordinate system.

The location of a customer within the warehouse floorplan layout 400 may be inferred by detecting a location of a mobile device 460 of the customer. The customer may opt in to allow their location to be tracked in the customer mobile application. The location of the mobile device 460 may be detected using cellular towers, satellite networks, beacons 470 located within the warehouse floorplan layout 400 (e.g., Bluetooth or WiFi beacons), or any other suitable system for detecting a location of the mobile device 460. As illustrated, the warehouse floorplan layout 400 comprises three beacons 470. However, any suitable number of beacons 470 may be located without the warehouse floorplan layout. For example, beacons 470 may be located at regular intervals, such as between 1-10 feet, along each aisle, which may provide precise location data for the customer.

In some embodiments, the location of the customer may be matched with specific products. For example, the location of products within each location in the warehouse floorplan layout 400 may be known, and the detected location of the customer may correspond to the location of a specific product. In some embodiments, the customer may scan an item or price tag associated with an item using the mobile device 460, and the customer mobile application may determine that the customer is located at the same location as the item. In some embodiments, the mobile device 460 may record a video stream. For example, the mobile device 460 may comprise an artificial reality headset comprising a camera. The video stream may be analyzed to identify items being viewed by the customer.

The location of the customer 460 within the warehouse floorplan layout 400, as well as the amount of time the customer 460 spends at each location, and the speed with which the customer 460 moves through various locations may be captured by the customer mobile application. The various location data may be utilized by the online concierge system 102 of FIG. 2. to determine customer preference information.

Suggestions Based on Physical Store Patterns

Figure 5:
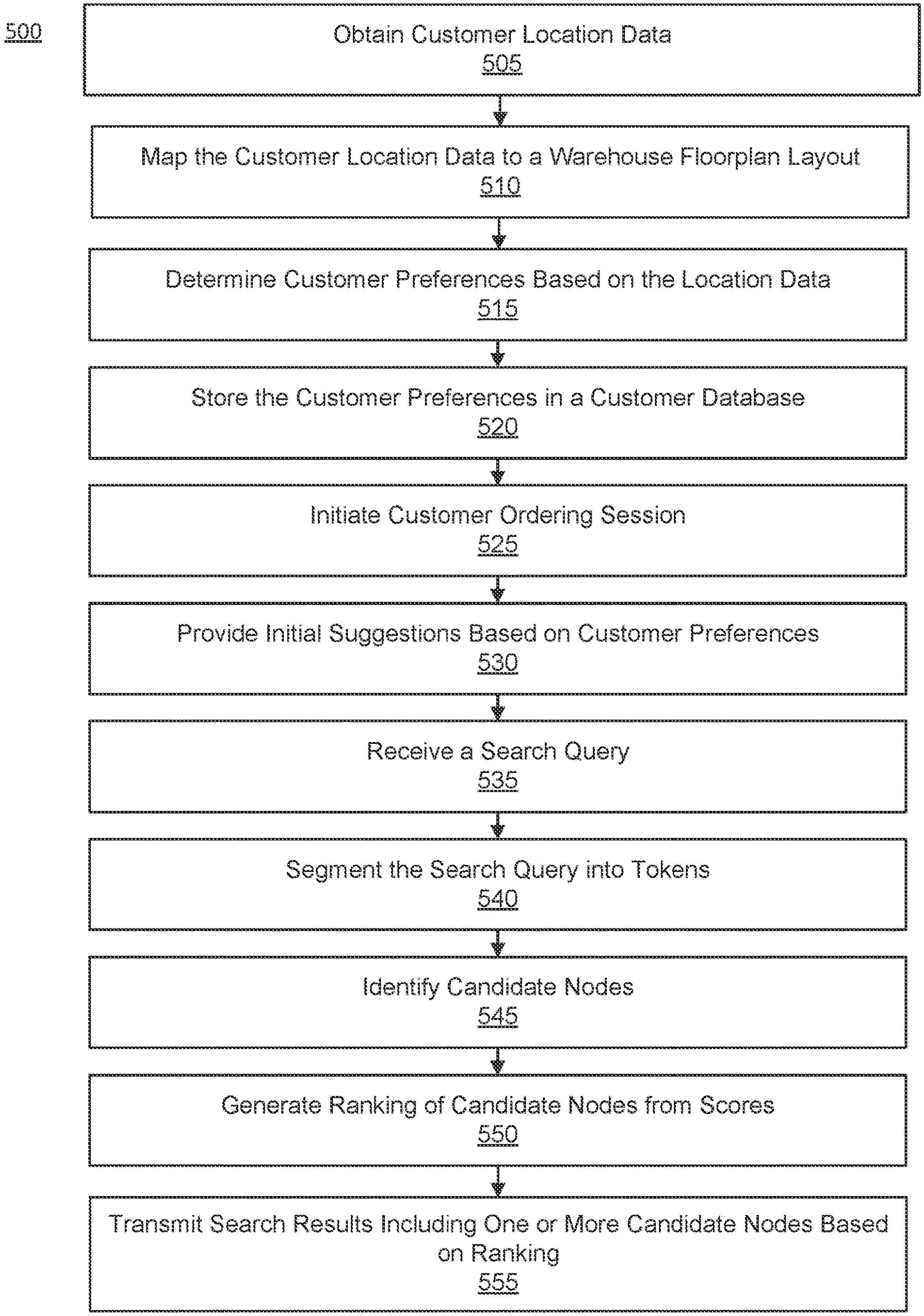
FIG. 5 is a flowchart of a process for selecting one or more nodes based on physical shopping preferences of a customer, according to one embodiment.

FIG. 5 is a flowchart 400 of one embodiment of a method for selecting one or more nodes based on physical shopping preferences of a customer using an item graph maintained by an online concierge system 102. In various embodiments, the method includes different or additional steps than those described in conjunction with FIG. 5. Further, in various embodiments, the steps of the method may be performed in different orders than the order described in conjunction with FIG. 5. The method described in conjunction with FIG. 5 may be carried out by the online concierge system 102 in various embodiments.

The online concierge system 102 obtains 505 customer location data. The customer location data may be obtained from a mobile device of the customer. For example, the mobile device may comprise a customer mobile application that tracks the location of the customer within a warehouse. In some embodiments, the online concierge system 102 may obtain customer location data from the warehouse. For example, the warehouse may use beacons to track the mobile device of the customer, and the warehouse may transmit the location data to the online concierge system. The location data describes the locations visited by the customer within the warehouse. The location data may describe the amount of time the customer spent at each location. The location data may describe the speed with which the customer moved between locations.

The location data may comprise locations in a reference coordinate system. For example, the location data may comprise GPS coordinates, coordinates with references to one or more fixed points in a warehouse, or any other reference system capable of identifying locations within a warehouse.

The online concierge system 102 maps 510 the customer location data to a warehouse floorplan layout. The warehouse floorplan layout may be defined using the same reference coordinate system as the customer location data. In some embodiments, the warehouse floorplan layout may be defined using a different reference coordinate system as the customer location data, and the online concierge system 102 may convert the customer location data into the reference coordinate system which defines the warehouse floorplan layout. Each location in the warehouse floorplan layout may be labeled based on the departments, aisles, items, or some combination thereof, nearest to the location. The locations in the warehouse floorplan layout may be mapped to nodes in an item graph. For example, a "cereal" aisle may map to a "cereal" node in the item graph.

The online concierge system 102 determines 515 customer preferences based on the customer location data. The customer preferences may be based on customer location data from multiple warehouses and from multiple visits to warehouses. For each location visited by a customer in a warehouse, the online concierge system 102 may determine that the customer has some level of interest in items near that location. The online concierge system 102 may weigh the level of interest based on an amount of time spent by the customer at each location. For example, the online concierge system 102 may score the level of interest by scoring one point for each second that a customer spends at a location. In some embodiments, the online concierge system 102 may determine that the customer is in one location if the customer remains within a radius, such as within ten feet, of a specific location. In some embodiments, the online concierge system 102 may weigh the level of interest based on a speed with which the customer moves through a location. For example, if a customer moves through an aisle at a walking pace of approximately 3 mph, the concierge system 102 may provide a low or negative weight for the customer's level of interest for items located in the aisle. In contrast, if the customer makes several brief stops, or moves at a browsing pace of less than 1 mph through an aisle, the online concierge system 102 may provide a relatively higher weight to the customer's level of interest for items located in the aisle.

In some embodiments, the online concierge system 102 determines customer preference data from customer actions within a warehouse. For example, the customer mobile application may encourage the customer to scan or photograph items, types of items, or departments, such as by providing a discount in exchange for the customer scanning an item they are considering purchasing. In response to the customer scanning the item, the online concierge system may determine that the customer may be likely to purchase the item or similar items in the future. In some embodiments, the online concierge system 102 may determine customer preferences by analyzing photographs or videos provided to the online concierge system 102 by the customer. For example, a video stream captured by a camera on an artificial reality headset may show which items the customer looked at, picked up, put it their shopping cart, purchased, or some combination thereof. The online concierge system 102 may determine that the customer may be more likely to purchase the items in the video stream in the future.

The online concierge system 102 stores 520 the customer preferences in a customer database. The online concierge system 102 associates the customer preferences with the customer profile for the customer in the customer database. The customer preferences may be mapped to nodes in the item graph. For example, the customer preferences may indicate that the customer is interested in canned soup, and the customer preference for canned soup may map to a node for canned soup in the item graph. In some embodiments, an edge may be created between the user and the node in the item graph, or a weight of the edge may be increased, based on the customer preference in the customer profile. The customer preferences may be weighted based on an age of the location data used to generate the customer preferences. In general, older location data may be less relevant to current customer orders. In some embodiments, a weight of a customer preference may decrease exponentially. For example, the weight for a customer preference may comprise a half-life of one day or one week.

In some embodiments, the customer preferences may be used to generate advertisements for the customer. For example, the online concierge system 102 may transmit advertisements for a particular product to the customer via the customer mobile application while the customer is located in a section of a warehouse containing the product. In some embodiments, the customer preference data may be used to transmit advertisements to the customer during an online session, such as via display ads, or via any other suitable form of digital advertising.

The online concierge system 102 initiates 525 a customer ordering session. The customer ordering session allows a customer to order items from the online concierge system 102, such as via a customer mobile application. The customer ordering session may be initiated in response to a customer performing an action. For example, the customer may open a mobile application or visit a website provided by the online concierge system 102.

The online concierge system 102 provides 430 initial suggestions to the customer based on the customer preferences stored in the customer database 216. The customer preferences stored in the customer database 216 include the customer preferences obtained based on the customer's location data. The initial suggestions may comprise items or categories of items the customer may be interested in purchasing. For example, if the customer preferences indicate that the customer previously spent time in a dairy section of a warehouse, the initial suggestions may comprise a dairy category or specific dairy items the customer may be interested in purchasing. The online concierge system 102 may select nodes in the item graph connected to the customer preferences for display as initial suggestions to the customer. In response to the customer selecting an attributed node from the initial suggestions, the online concierge system 102 may display items connected to the attribute node in the item graph. In response to the customer selecting an item node, the online concierge system 102 may prompt the customer to add the item to a digital shopping cart for purchase.

The online concierge system 102 receives 535 a search query from a customer 104 through the CMA 106. The search query includes one or more search terms for identifying one or more items the customer 104 seeks to purchase via the online concierge system 102. For example, the online concierge system 102 receives a selection of a warehouse 110 for fulfilling an order from the customer 104 then receives 405 a search query to identify one or more items offered by the selected warehouse 110.

However, search terms in the received search query may not correspond to specific items offered by the warehouse 110 or may partially identify multiple items offered by the warehouse 110. To identify nodes matching one or more of the search terms included in the search query, the online concierge system 102 retrieves an item graph stored by the online concierge system 102. The item graph comprises a plurality of nodes, with item nodes corresponding to an item available through the online concierge system 102 and attribute nodes corresponding to an attribute of an item available through the online concierge system 102, as further described with respect to FIG. 6.

In some embodiments, the online concierge system 102 may autocomplete the search query based on the customer preferences. The online concierge system 102 may receive a portion of a word entered by a customer and determine the intended word based on the customer preferences. For example, the customer may be ordering from a warehouse. The customer may enter the letters "ch" into a search query field. The online concierge system 102 may determine based on the customer preferences that the customer often spends time in the dairy section when physically visiting the warehouse and seldom spends time in the meat section. Thus, the online concierge system may suggest "cheese" as an autocompleted search query, as opposed to "chicken." In contrast, for a user that often spends time in the meat section and rarely visits the dairy section, the online concierge system 102 may suggest "chicken" as an autocompleted search query.

The online concierge system 102 segments 540 the received search query into tokens, with each token comprising one or more search terms included in the search query. The online concierge system 102 may use any suitable method for segmenting the received search query. For example, the online concierge system 102 identifies one or more specific delimiter characters in the received search query and segments the search terms in the search query into tokens separated by the specific delimiter characters. As an example, a specific delimiter character is a space, so the online concierge system 102 segments the received search query into tokens that are individual words included in the search query, so an example search query of "organic whole milk" is segmented into "organic," "whole," and "milk." Alternatively, the online concierge system 102 maintains a trained machine learned model for segmenting the received search query into tokens and applies the trained machine learned model to the received search query to segment the received search query into tokens.

From the tokens identified from the search query, the online concierge system 102 generates combinations of tokens. In various embodiments, the online concierge system 102 generates each possible combination of tokens from the segmented search query. Alternatively, the online concierge system 102 generates a specific number of different combinations of tokens from the segmented search query. The online concierge system 102 may maintain a parameter identifying the specific number of combinations of tokens that are generated.

The online concierge system 102 compares each generated combination of tokens to nodes in the item graph. When a combination of tokens includes one or more tokens matching an attribute node in the item graph, the online concierge system 102 traverses the item graph using connections between the attribute nodes matching one or more of the tokens in the combination to identify an item node connected to the attribute node matching one or more of the tokens in the combination. The online concierge system 102 may more heavily weigh attribute nodes which are connected to the customer preferences.

The online concierge system 102 identifies 545 candidate item nodes based on the comparison. Item nodes connected to one or more attribute nodes matching one or more tokens in the combination are identified as candidate item nodes for display as search results.

In various embodiments, the online concierge system 102 stores a mapping between tokens and alternative terms. For example, the mapping associates a token with one or more synonyms for the token. When comparing a combination of tokens to the nodes in the item graph, the online concierge system 102 retrieves synonyms for one or more tokens from the mapping and compares one or more synonyms for a token to nodes in the item graph, allowing the online concierge system 102 to account for variations in how different customers provide search terms for one or more items to the online concierge system 102. In various embodiments, the online concierge system 102 generates the mapping based on search terms previously received from customers and attributes of items that the customers selected for inclusion in orders after receiving search results for the previously received search terms.

The online concierge system 102 accounts for connections between attribute nodes to identify candidate nodes. In various embodiments, the online concierge system 102 determines an additional attribute node connected to the attribute node matching one or more tokens in the combination via the item graph and identifies 430 an item node connected to the additional attribute node as a candidate item node for display.

The online concierge system 102 scores candidate nodes in the item graph. The online concierge system 102 may determine a score for each identified candidate item node or for each of at least a set of the identified candidate item nodes. The online concierge system 102 may also determine a score for candidate attribute nodes in the item graph. In various embodiments, the online concierge system 102 determines the score for a candidate node based on a number of attribute nodes connected to the candidate node that match one or more tokens in the combination. A candidate node connected to a greater number of attribute nodes matching one or more tokens in the combination may have a higher score. The online system 102 may account for a number of connections between the candidate node and attribute nodes matching one or more tokens in the combination. For example, the online concierge system 102 assigns a weight to the attribute node matching one or more tokens in the combination that is inversely related (e.g., inversely proportional) to a number of connections between the candidate node and one or more attribute nodes matching one or more tokens in the combination. The online concierge system 102 may increase the weight of an attribute node matching one or more customer preferences based on the customer's location data. The score for the candidate node may be determined by combining the weighted attributes matching one or more tokens of the combination connected to the candidate node. When determining the score for a combination of tokens, the online concierge system 102 may generate a score for the combination based on comparison of different synonyms for tokens in the combination to the item graph, and determine the score for the combination of tokens as a maximum score of the scores determined for different synonyms of the tokens in the combinations. This allows the online concierge system 102 to leverage connections between attribute nodes in the item graph to identify candidate nodes based on a search query, while accounting for distance between candidate nodes and attribute nodes matching one or more tokens in a combination generated from the search query.

When scoring a candidate node, the online concierge system 102 may account for prior actions by customers 104. A connection between an attribute node and a candidate node may include a value based on a number of times or frequency that a search query mapped to the attribute node led to a purchase of the candidate item node. A connection between an attribute node and another attribute node may include a value based on inclusion of an item having the attribute in previously received orders along with one or more other items having the other attribute or inclusion of an item having both the attribute and the additional attribute in received orders. In various embodiments, a weight of a connection between a candidate node and attribute node that is connected to an additional attribute node that matches one or more tokens in the combination is modified based on the value of the connection between the attribute node and the additional attribute node. For example, greater values of the connection between the attribute node and the additional attribute node increase the weight of the connection between the candidate node and the attribute node, while lower values of the connection between the attribute node and the additional attribute node decrease the weight of the connection between the candidate node and the attribute node. This allows the online concierge system 102 to account for prior interactions by customers with items having different attributes when determining relatedness or similarity between the different attribute nodes. As the value of a connection between an attribute node and an additional attribute node may change as the online concierge system 102 receives orders from customers, the similarity between attribute nodes connected to each other in the item graph may be modified over time.

The online concierge system 102 generates 550 a ranking of candidate item nodes. The online concierge system 102 may rank the candidate item nodes based on the scores determined for the candidate item nodes. In various embodiments, the online concierge system 102 generates a ranking of candidate item nodes identified for each combination of tokens from the search query. The online concierge system 102 may generate the ranking to include candidate item nodes satisfying one or more criteria. For example, the online concierge system 102 selects candidate item nodes having at least a threshold score and generates the ranking from the selected candidate item nodes. In various embodiments, the online concierge system 102 generates the ranking so candidate item nodes with higher scores have higher positions in the ranking.

Based on the ranking, the online concierge system 102 transmits 555 search results for the search query including one or more of the candidate item nodes to a client device (e.g., a mobile device or a computer displaying the customer mobile application 106) of the customer 104 for display. For example, the online concierge system 102 selects candidate item nodes having at least a threshold position in the ranking and transmits the selected candidate item nodes as the search results. In various embodiments, the online concierge system 102 maintains different threshold positions for different types of items. For example, the online concierge system 102 receives compensation for displaying certain items in search results, and the online concierge system 102 maintains the threshold position for items for which the online concierge system 102 does not receive compensation for displaying, while maintaining an alternative threshold position for items for which the online concierge system 102 receives compensation for displaying. The alternative threshold position may be lower in the ranking than the threshold position in various embodiments. The online concierge system 102 may include a specific number of items (or percentage of items) for which the online concierge system 102 receives compensation for displaying in the search results, so the online concierge system 102 selects the specific number of items for which the online converge system 102 receives compensation for displaying that have at least the threshold position in the ranking, while selecting the remaining items, for which the online concierge system 102 does not receive compensation for displaying, as items having at least the threshold position in the ranking. The search results display the candidate item nodes in an order determined by the ranking in various embodiments. Alternatively, the online converge system 102 selects candidate item nodes having at least a threshold score and displays the selected candidate item nodes as the search results. This allows the online concierge system to provide candidate item nodes more likely to match the search query by accounting for connections between attributes that may match the search query generated from previously received search queries as well as attributes identified for specific products, increasing information that may be evaluated against the received search query. In response to a customer selecting an item node, the online concierge system 102 prompts the customer to order the item corresponding to the item node.

Figure 6:
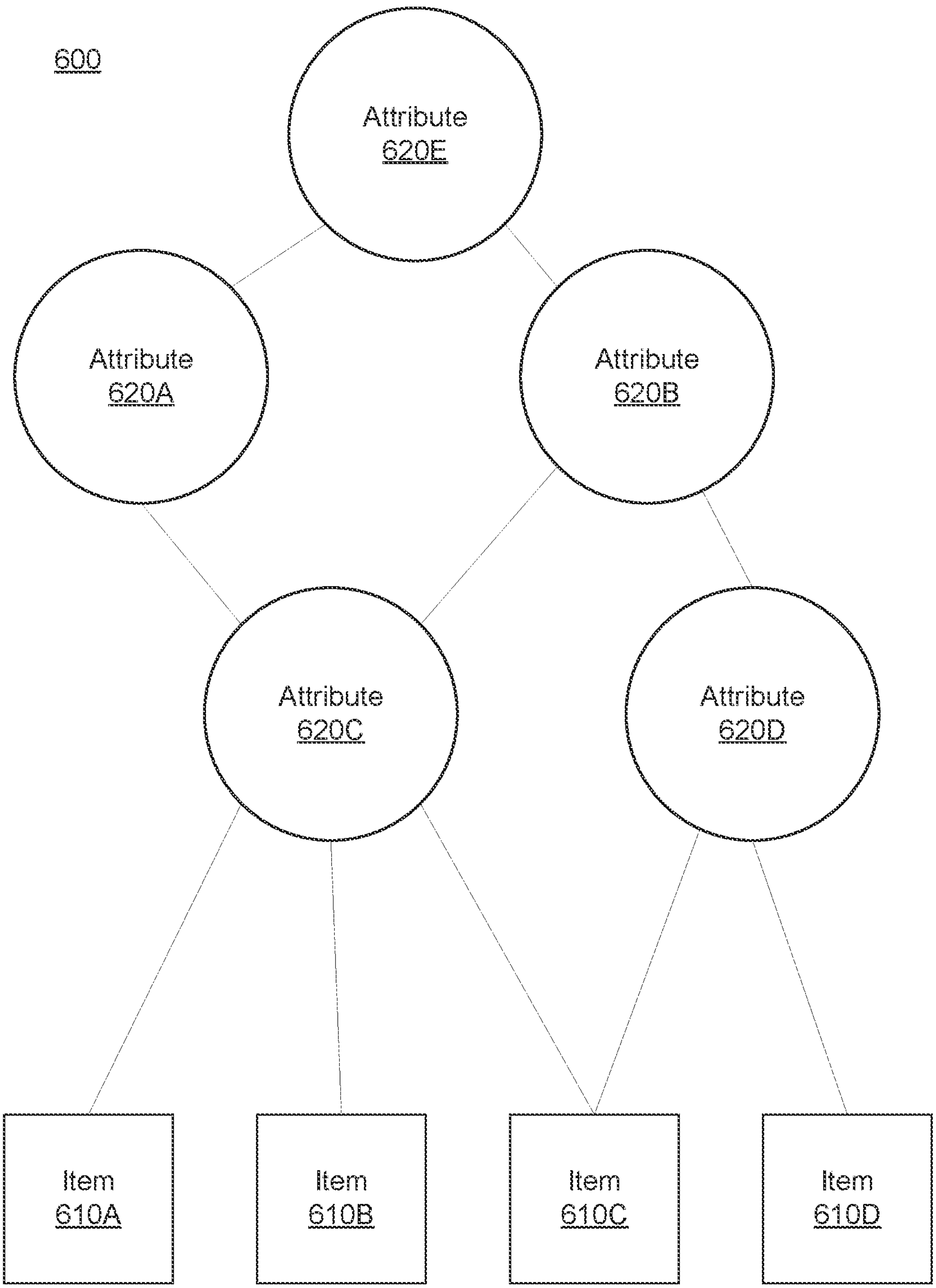
FIG. 6 is an example of an item graph maintained by an online concierge system, according to one embodiment.

FIG. 6 shows an example item graph 600 maintained by the online concierge system 102. The item graph 600 may be an embodiment of the item graphs described with respect to FIG. 2. As further described above in conjunction with FIG. 2 and FIG. 5, the item graph includes item nodes representing items offered by the online concierge system 102 and attribute nodes representing attributes of the items, along with connections between nodes. In the example of FIG. 6, the item graph 600 includes item node 610A, item node 610B, item node 610C, and item node 610D (also referred to individually and collectively using reference number 610). The item graph 600 also includes attribute node 620A, attribute node 620B, attribute node 620C, attribute node 620D, and attribute node 620E (also referred to individually and collectively using reference number 620). In various embodiments, the item graph 600 may comprise large numbers of item nodes, attribute nodes, and hierarchical levels of nodes. However, only a small subset of an item graph is displayed in FIG. 6 for ease of illustration. A connection between an item node 610 and an attribute node 620 in the item graph 600 indicates that the item of item node 610 has the attribute of attribute node 620 based on information about the items obtained by the online concierge system 102. As illustrated, item node 610A is connected to attribute node 620C, indicating that the item of item node 610A has the attribute of attribute node 620C. Similarly, item node 610C is connected to attribute node 620C and attribute node 620D because the item of item node 610C has the attributes of attribute node 620C and attribute node 620D.

Connections between item nodes 610 and attribute nodes 620 are based on information about items obtained by the online concierge system 102. For example, the online concierge system 102 receives a product catalog from a warehouse 110 identifying items offered for purchase by the warehouse 110. Each entry in the product catalog includes information identifying an item and one or more attributes associated with the item. The online concierge system 102 generates the item graph 600 so the item node 610 has a connection to each attribute node 620 associated with the item by the product catalog. Additionally, attributes of an item 610 may be specified by the online concierge system 102, such as one or more categories or descriptions associated with the item by the online concierge system 102, with the item graph 600 establishing connections between the item nodes 610 and attribute nodes for the item specified by the online concierge system 102.

The item graph 600 includes connections between various pairs of nodes. A connection between an item node 610 and an attribute node 620 indicates that the attribute is associated with the item. The item graph 600 are arranged in a hierarchical taxonomy of items. A parent attribute node, such as attribute node 620B, may be connected to one or more child attribute nodes, such as attribute node 620C and attribute 620D, at a lower level of the taxonomy. For example, a "dairy" attribute node may be connected to lower level attribute nodes for "butter," "milk," "eggs," etc. Similarly, attribute node 620C is connected to child item nodes for specific items that contain the attribute. Additionally, a child attribute node or child item node may be connected to one or more parent nodes at a higher level of the taxonomy. As illustrated, attribute node 620C is connected to parent attribute node 620A and parent attribute node 620B. For example, an attribute node for "eggs" may be connected to higher level nodes for "dairy," "baking ingredients," "breakfast items," etc.

The online concierge system 102 generates the item graph 600 based on a product catalog received from the warehouse 110, where each entry in the product catalog includes information identifying an item (e.g., an item identifier, an item name) and one or more attributes of the item. Example attributes of an item include: one or more keywords, a brand offering the item, a manufacturer of the item, a type of the item, and any other suitable information. Additionally, one or more attributes of an item may be specified by the online concierge system 102 for the item. Example attributes specified by the online concierge system 102 for an item include: a category for the item, one or more sub-categories for the item, and any other suitable information for the item. Attributes specified by the online concierge system 102 have corresponding attribute nodes that are connected to an item node for the item in the item graph.

In various embodiments, a connection between nodes in the item graph includes one or more values representing a measure of connectedness between the pair of nodes that are connected. The value included in a connection between nodes is based on based on prior customer actions when ordering items from the online concierge system 102. For example, a value of a connection between an attribute node 620 and an item node 610 may be based on a frequency with which customers purchase the item after entering a search query which is mapped to the attribute node 620. A value of a connection between a first attribute node 620 and a second attribute node 620 may be based on a frequency with which a first item having the first attribute is included in an order by a customer along with a second item having the second attribute. As another example, the value of the connection between the first attribute node 620 and the second attribute node 620 may be based on a number of times a first item having the first attribute is included in an order by a customer along with a second item having the second attribute. In another example, the value of the connection between the first attribute node 620 and the second attribute node 620 is determined from a number of times (or a frequency with which) previously received orders included an item having both the first attribute and the second attribute. The online concierge system 102 modifies the measure of connectedness between nodes in the item graph over time as customers include items connected to various attribute nodes 620 in orders received by the online concierge system 102. This allows the online concierge system 102 to maintain information identifying relationships between different attributes of items as well relationships between attributes and items based on items included in orders previously received by the online concierge system 102 and information about items received by the online concierge system 102.

The item nodes 610 and the attribute nodes 620 may comprise a customer preference weight unique to each customer. Based on the customer preferences in the customer profile, customer preference weights may be assigned to nodes in the item graph 600 corresponding to the customer preferences. When retrieving the item graph 600 to provide initial suggestions to a customer or in response to a search query from the customer, the online concierge system 102 may map the customer preferences to nodes in the item graph 600 and assign the customer preference weights based on the customer preferences. Thus, the suggested results presented to the customer may be based in part on the customer preferences, which in turn may be based on the customer's location data when shopping in a physical warehouse.

Figure 7:
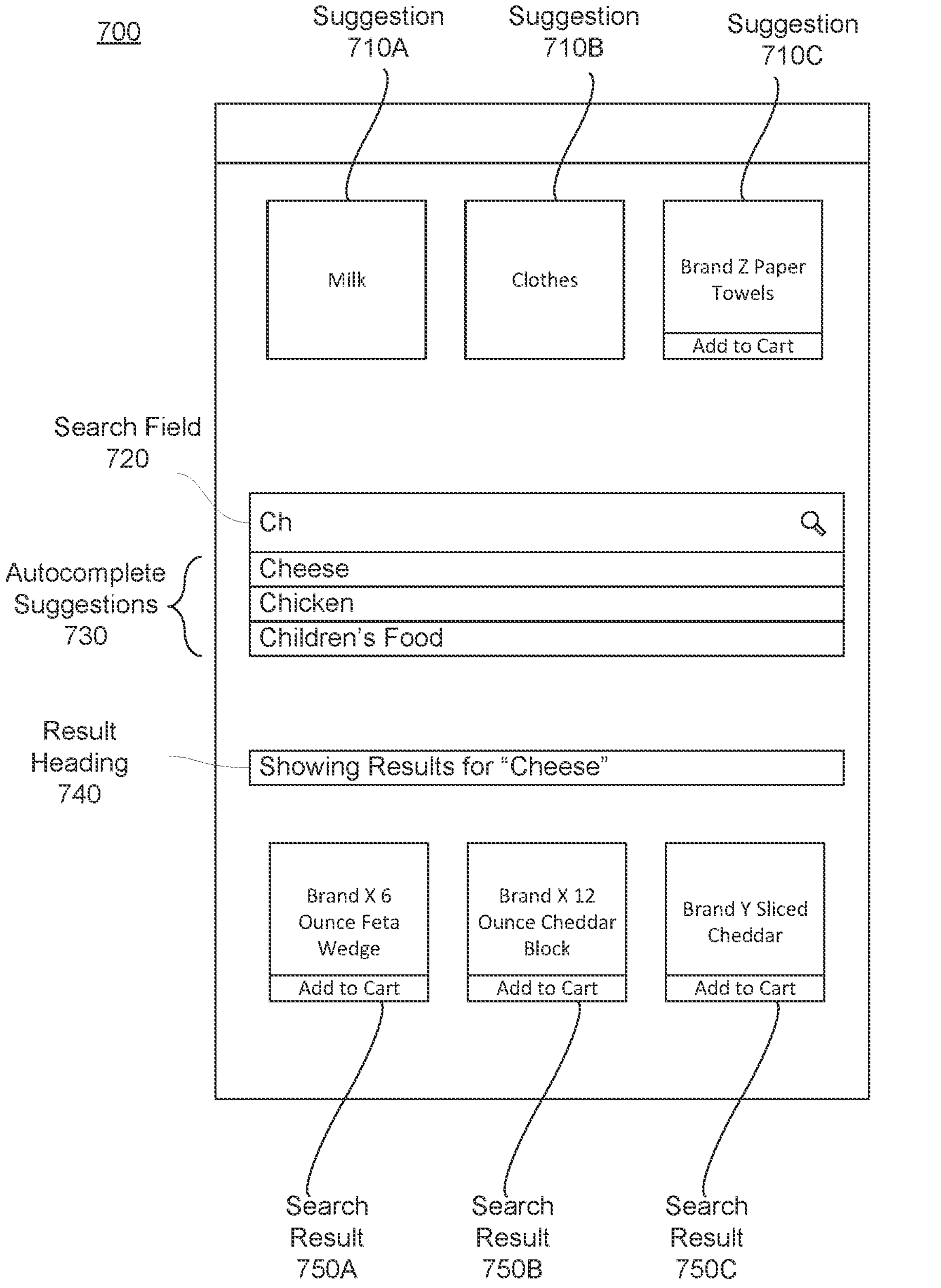
FIG. 7 is an example of an ordering interface for an online concierge system, according to one embodiment.

Referring to FIG. 7, an example ordering interface 700 including search results is illustrated, according to an embodiment of the invention. The ordering interface 700 includes suggestions 710. The suggestions 710 may be based on stored customer preferences, including customer preferences based on customer location data. The suggestions 710 may be displayed prior to the customer entering a search query. The suggestions 710 may comprise item categories or specific items. For example, suggestion 710A comprises a milk category, suggestion 710B comprises a clothes category, and suggestion 710C comprises an item for Brand Z Paper Towels, which the customer may select to order. The ordering interface 700 includes a search field 720. The customer has entered "Ch" in the search field 720. The ordering interface 700 comprises autocomplete suggestions 730 based on the input to the search field 720. The autocomplete suggestions 730 may be selected or ordered based on the customer preferences.

The online concierge system 102 executes a search query in an item graph, such as the item graph 600 of FIG. 6, based on the search terms, as previously described with reference to FIG. 5 and FIG. 6. The online concierge system 102 may dynamically update the search query in response to the customer changing the input in the search field 720. The online concierge system 102 may display a result heading 740 indicating the search terms being used to generate the search results 750. The search results 750 are displayed on the ordering interface 700. In some embodiments, the ordering interface 700 may display alternative query formulations which the customer may select to submit an alternative search query. The search results 750 may be displayed in a grid on the ordering interface 700. As illustrated, the search results 750 are displayed in a 1×3 grid. However, the search results 750 may be displayed in any suitable size grid. The search results 750 may be displayed in a ranked order of conversion probability. The search results 750 represent nodes in the item graph that are likely to lead to a conversion based on the search terms entered by the customer and the customer preferences. The search results include item nodes 750. For example, the online concierge system 102 may tokenize the search terms and map the tokens to the item graph. The tokens may map to an attribute node for cheese, and the online concierge system may select item nodes at one or more taxonomy levels below the attribute node. A search result 750A allows the customer to purchase a Brand X 6 ounce wedge of feta; a search result 750B allows the customer to purchase a Brand X 12 ounce cheddar block; and a search result 750C allows the customer to purchase a Brand Y pack of sliced cheddar. In some embodiments, the search results may comprise item categories corresponding to attribute nodes, which allow the customer to select the item category as a new search, and the online concierge system 102 may select items in the category as results to display to the customer.

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:

receiving, by an online concierge system from a plurality of client devices associated with pickers fulfilling orders at a warehouse, location data of the pickers, wherein the location data for each client device is captured by a location sensor implemented on the client device;

localizing a plurality of items in a coordinates grid of a layout of the warehouse based on location coordinates of the pickers at a respective point of obtainment of each item;

generating, via the location coordinates of the plurality of items localized in the coordinates grid of the layout of the warehouse, an item graph for the warehouse comprising a plurality of attribute nodes, a plurality of item nodes, and a plurality of connections between the attribute nodes and the item nodes, wherein each attribute node corresponds to a location on the coordinates grid of the layout of the warehouse, each item node corresponds to an item in the plurality of items, and each connection links one item node to one attribute node indicating that the item node has an attribute corresponding to the linked attribute node;

storing the item graph for the warehouse;

receiving, by the online concierge system from a client device associated with a user, location data captured by a location sensor of the client device of the user, wherein the location data comprises location coordinates for the client device;

mapping the location data to the layout of the warehouse to identify a set of attribute nodes each with location coordinates in proximity to the location coordinates of the client device;

determining level of interest based on an amount of time spent by the client device in proximity to the identified set of attribute nodes;

initiating a user ordering session;

weighting item nodes in the item graph based on the level of interest, wherein item nodes connected to the identified set of attribute nodes are weighted higher than item nodes not connected to the identified set of attribute nodes;
receiving a search query including one or more search terms from the client device of the user;
identifying a set of candidate attribute nodes in the item graph based on the search query;
identifying a set of items nodes in the item graph that are connected, in the item graph, to candidate attribute nodes of the set of candidate attribute nodes and the set of attribute nodes corresponding to the location coordinates of the client device;
generating a ranking of the set of item nodes;
transmitting search results including one or more of items of the set of item nodes based on the ranking; and
causing presentation of the search results on a graphical user interface displayed on the client device.

2. The method of claim 1, further comprising segmenting the search query into tokens, each token comprising one or more of the search terms.

3. The method of claim 1, further comprising autocompleting the search query based on the level of interest.

4. The method of claim 1, wherein receiving the location data comprises tracking a location of a mobile device within a warehouse based on GPS location data from a GPS sensor of the mobile device.

5. The method of claim 1, further comprising:
storing level of interest in a customer database; and
identifying the set of candidate attribute nodes in the item graph based on the level of interest.

6. The method of claim 1, wherein the location data comprises a speed of the user through a section of a warehouse.

7. The method of claim 1, further comprising generating a score for each of the identified candidate attribute nodes.

8. The method of claim 1, wherein the set of candidate attribute nodes are selected based on a conversion probability for the candidate attribute nodes, wherein the conversion probability is calculated by a machine learning model.

9. The method of claim 8, wherein the machine learning model is trained using a set of training data comprising location data, search results, and labels indicating whether the search results resulted in a conversion.

10. The method of claim 1, further comprising weighting the level of interest based on an age of the location data.

11. A computer program product comprising a non-transitory computer readable storage medium having instructions encoded thereon that, when executed by a processor, cause the processor to:
receive, by an online concierge system from a plurality of client devices associated with pickers fulfilling orders at a warehouse, location data of the pickers, wherein the location data for each client device is captured by a location sensor implemented on the client device;
localize a plurality of items in a coordinates grid of a layout of the warehouse based on location coordinates of the pickers at a respective point of obtainment of each item;
generate, via the location coordinates of the plurality of items localized in the coordinates grid of the layout of the warehouse, an item graph for the warehouse comprising a plurality of attribute nodes, a plurality of item nodes, and a plurality of connections between the attribute nodes and the item nodes, wherein each attribute node corresponds to a location on the coordinates grid of the layout of the warehouse, each item node corresponds to an item in the plurality of items, and each connection links one item node to one attribute node indicating that the item node has an attribute corresponding to the linked attribute node;
store the item graph for the warehouse;
receive, by the online concierge system from a client device associated with a user, location data captured by a location sensor of the client device of the user, wherein the location data comprises location coordinates for the client device;
map the location data to the layout of the warehouse to identify a set of attribute nodes each with location coordinates in proximity to the location coordinates of the client device;
determine level of interest based on an amount of time spent by the client device in proximity to the identified set of attribute nodes;
initiate a customer ordering session;
weight item nodes in the item graph based on the level of interest, wherein item nodes connected to the identified set of attribute nodes are weighted higher than item nodes not connected to the identified set of attribute nodes;
receive a search query including one or more search terms from the client device of the user;
identify a set of candidate attribute nodes in the item graph based on the search query;
identify a set of items nodes in the item graph that are connected, in the item graph, to candidate attribute nodes of the set of candidate attribute nodes and the set of attribute nodes corresponding to the location coordinates of the client device;
generate a ranking of the set of item nodes;
transmit search results including one or more of items of the set of item nodes based on the ranking; and
causing presentation of the search results on a graphical user interface displayed on the client device.

12. The computer program product of claim 11, wherein the processor is further configured to segment the search query into tokens, each token comprising one or more of the search terms.

13. The computer program product of claim 11, wherein the processor is further configured to autocomplete the search query based on the level of interest.

14. The computer program product of claim 11, wherein receiving the location data comprises tracking a location of a mobile device within a warehouse based on GPS location data from a GPS sensor of the mobile device.

15. The computer program product of claim 11, wherein the processor is further configured to:
store user preferences in a user database; and
identify the set of candidate attribute nodes in the item graph based on the level of interest.

16. The computer program product of claim 11, wherein the location data comprises a speed of the user through a section of a warehouse.

17. The computer program product of claim 11, wherein the processor is further configured to generate a score for each of the identified candidate attribute nodes.

18. The computer program product of claim 11, wherein the set of candidate attribute nodes are selected based on a conversion probability for the candidate attribute nodes, wherein the conversion probability is calculated by a machine learning model.

19. The computer program product of claim 18, wherein the machine learning model is trained using a set of training data comprising location data, search results, and labels indicating whether the search results resulted in a conversion.

20. The computer program product of claim 11, wherein the processor is further configured to weight the level of interest based on an age of the location data.

* * * * *